United States Patent [19]

Schluns

[11] 4,236,749

[45] Dec. 2, 1980

[54] ICEBOX FOR A RECREATIONAL VEHICLE

[76] Inventor: Steven M. Schluns, Box 141, O'Neill, Nebr. 68763

[21] Appl. No.: 23,603

[22] Filed: Mar. 26, 1979

[51] Int. Cl.³ .............................................. B60H 3/04
[52] U.S. Cl. .................................. 296/156; 296/37.8; 62/244; 62/258; 62/459
[58] Field of Search ................ 62/244, 371, 372, 529, 62/459, 239, 463, 457, 258; D12/155; 296/156, 63, 24 B, 37.1, 37.8; 248/131

[56] References Cited

U.S. PATENT DOCUMENTS

| | | | |
|---|---|---|---|
| 33,642 | 11/1861 | Gates | 62/463 X |
| 307,341 | 10/1884 | Shaw | 62/457 X |
| 2,226,925 | 12/1940 | Ehret | 248/131 X |
| 2,525,952 | 10/1950 | Saterlie et al. | 296/37.8 X |
| 2,581,867 | 1/1952 | Krohnert | 296/24 B X |
| 3,403,830 | 10/1968 | Jones et al. | 296/37.8 X |
| 4,163,374 | 8/1979 | Moore et al. | 62/457 |

Primary Examiner—Albert J. Makay
Assistant Examiner—William E. Tapolcai, Jr.
Attorney, Agent, or Firm—Zarley, McKee, Thomte, Voorhees & Sease

[57] ABSTRACT

An icebox for a recreational vehicle such as a van or the like is described and comprises a hollow cylindrical portion which is rotatably mounted in the interior of the van. A tabletop portion is provided on the upper end of the cylindrical portion. An access door is provided at one side of the icebox so that the interior of the icebox is easily accessible. A layer of insulation material is provided between the walls of the icebox. The icebox is centrally positioned in the van or recreational vehicle between the sidewalls so that the icebox is easily accessible from the plurality of seats positioned therearound. The icebox not only serves as an icebox but as a table and its centrally located position enhances its utility.

4 Claims, 4 Drawing Figures

ICEBOX FOR A RECREATIONAL VEHICLE

BACKGROUND OF THE INVENTION

This invention relates to an icebox for a recreational vehicle and more particularly to an icebox which does not occupy an objectionable amount of space and which is easily accessible.

In recreational vehicles such as vans or the like, the iceboxes are normally positioned adjacent one sidewall of the van and frequently take the place of a seat if an icebox is provided. The conventional iceboxes which are normally used in vans or the like are only accessible from the front thereof due to the location of the icebox adjacent the sidewall of the van. Thus, the driver or the passenger do not have convenient access to the icebox and must leave their seats in order to reach the icebox.

Therefore, it is a principal object of the invention to provide an improved icebox for a recreational vehicle such as a van or the like.

A further object of the invention is to provide an icebox for a recreational vehicle wherein the icebox is centrally located within the vehicle so that access thereto is convenient.

A further object of the invention is to provide an icebox for a recreational vehicle which is rotatably mounted on the interior floor of the vehicle so that the icebox may be conveniently reached.

A still further object of the invention is to provide an icebox for a recreational vehicle which also serves as a table.

A still further object of the invention is to provide an icebox for a recreational vehicle which does not occupy an objectionable amount of space.

These and other objects will be apparent to those skilled in the art.

DESCRIPTION OF THE PREFERRED EMBODIMENT

Figure 1:
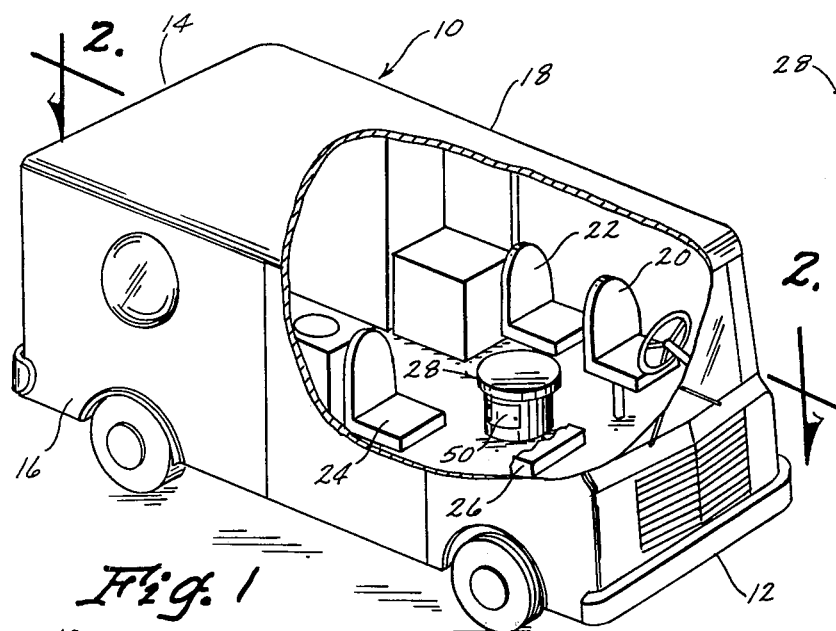
FIG. 1 is a front perspective view of a conventional recreational vehicle having a portion thereof cut away to illustrate the icebox of this invention positioned therein.
Figure 3:
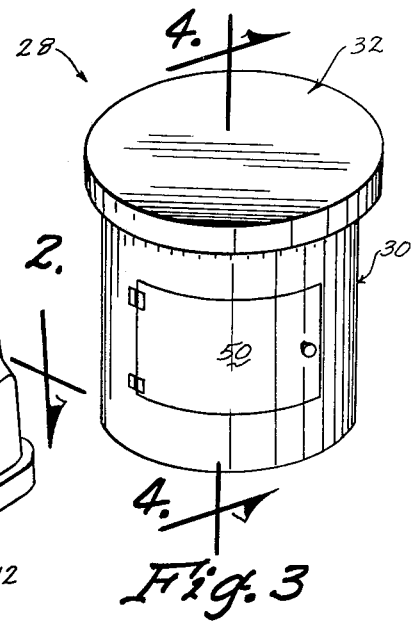
FIG. 3 is a perspective view of the icebox of this invention.

The numeral 10 refers generally to a conventional recreational vehicle such as a van or the like including a forward portion 12, rearward portion 14 and opposite sides 16 and 18. The vehicle 10 includes a driver's chair or seat 20 and passenger seats 22, 24 and 26. Ordinarily, the recreational vehicle would include an icebox but the icebox would be positioned adjacent one of the sides 16 or 18.

The icebox of this invention is referred to generally by the reference numeral 28 and generally comprises a hollow cylindrical portion 30 and a tabletop portion 32. Cylindrical portion 30 is provided with a base portion 34 which is preferably rotatably secured to the floor of the recreational vehicle which is referred to generally by the reference numeral 36. Fixture 38 is mounted in the floor 36 of the vehicle and includes a hollow portion adapted to receive a downwardly extending stub which is secured to the bottom of the icebox 28. The icebox 28 is rotatably mounted in the fixture as described and is removably mounted therein so that the icebox can be moved to a location rearwardly of the location seen in FIG. 1.

Icebox 28 is provided with an interior wall portion 40 which is spaced inwardly from the exterior wall to provide a space therebetween to enable insulation 42 to be positioned therein. The numeral 44 refers to a tray positioned in the icebox adapted to receive the ice 46. Adjustable shelves 48 are provided in the interior of the icebox. The numeral 50 refers to an access door provided in the cylindrical portion 30 which is pivotally mounted or hingedly mounted to enable access to be gained to the interior of the icebox.

Figure 2:
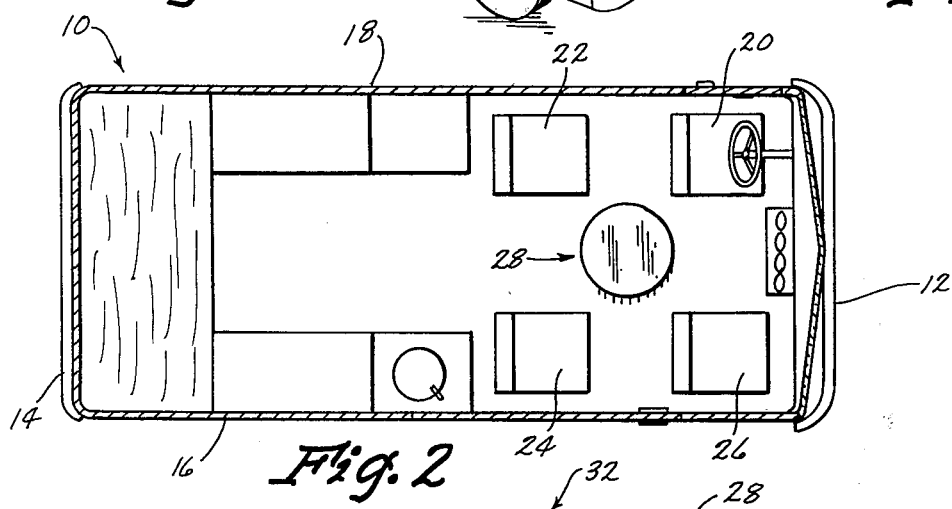
FIG. 2 is a sectional view seen on lines 2—2 of FIG. 1.
Figure 4:
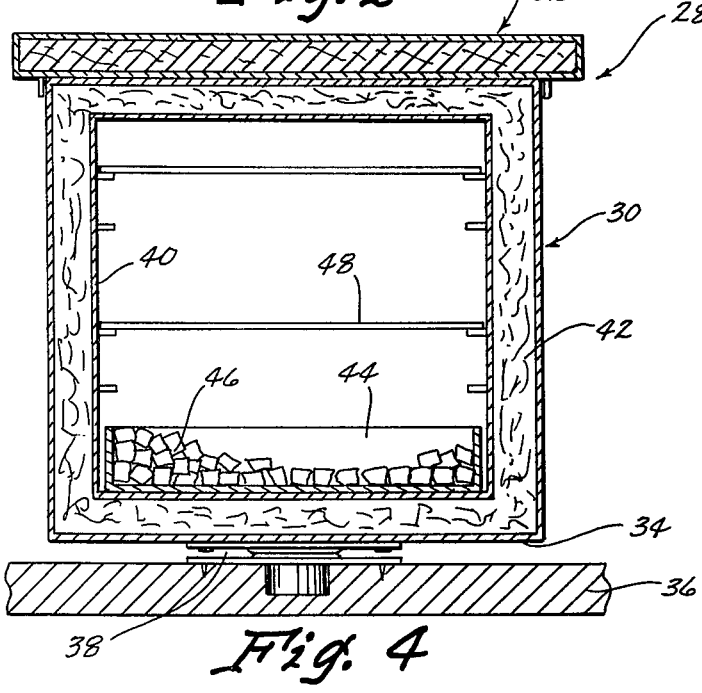
FIG. 4 is an enlarged sectional view seen on lines 4—4 of FIG. 3.

The icebox 28 is centrally located between the walls 16 and 18 and is located rearwardly of the driver's seat 20. As seen in FIGS. 1 and 2, the icebox 28 is centrally positioned and is easily accessible from all of the passenger seats as well as the driver's seat in the vehicle. The icebox may be rotated so that the door 50 will be accessible from any of the vehicle seats. The tabletop 32 enables the icebox to also serve as a table for eating purposes.

The fact that the icebox 28 is centrally located in the recreational vehicle is very important in that the icebox is not only easily accessible but does not objectionably occupy what would normally be used as an area for an additional seat. In other words, the conventional vans normally have the rectangular icebox or square icebox located in the area where seat 22 is located.

The walls of the icebox 28 may be constructed of plastic or metal material as desired. Additionally, the exterior of the icebox 28 may be covered with material which matches the decor of the van, if so desired.

Thus it can be seen that the icebox of this invention accomplishes at least all of its stated objectives.

I claim:

1. In combination,
   a recreational vehicle including an interior compartment having forward and rearward ends and opposite sides,
   an icebox in said interior compartment, said icebox comprising an upright sidewall means having upper and lower ends, a tabletop, mounted on the upper end of said sidewall means, and an access door provided in said sidewall means,
   means for substantially centrally positioning and rotatably mounting said icebox relative to said sides of said interior compartment and spaced from both the forward and rearward ends of the interior compartment so that said icebox is readily accessible from all sides thereof.

2. The combination of claim 1 wherein said icebox is provided with a layer of insulation extending therearound.

3. The combination of claim 1 wherein said vehicle has a plurality of chairs positioned in said interior compartment, said icebox being substantially centrally positioned with respect to said chairs.

4. The combination of claim 1 wherein said upright sidewall means comprises a hollow cylindrical portion.

* * * * *